FRED. L. MILLER.
Improvement in Soldering Apparatus.

No. 120,991. Patented Nov. 14, 1871.

Witnesses
Fred. L. Miller.

120,991

UNITED STATES PATENT OFFICE.

FREDERICK L. MILLER, OF BROOKLYN, NEW YORK.

IMPROVEMENT IN SOLDERING-APPARATUS.

Specification forming part of Letters Patent No. 120,991, dated November 14, 1871.

*To all whom it may concern:*

Be it known that I, FREDERICK L. MILLER, of Brooklyn, in the county of Kings and State of New York, have invented a new and Improved Apparatus for Soldering Cans, &c.; and I do hereby declare that the following is a full, clear, and exact description thereof, reference being had to the accompanying drawing forming part of this specification.

The invention is principally designed for soldering the tops and bottoms to the bodies of such cans as are used for holding fruit or paint. It consists principally in an inclined revolving soldering-bed, which is formed to receive and hold the can to be soldered, and is heated by suitable means, and so caused to heat the joint of the can placed upon it that a piece of solder placed within the can is melted, and the soldering is effected simply by the revolution of the bed and its inclined position, which causes the melted solder to run all round the joint. The invention also embraces certain means of heating the said bed by the flame of one or more gas-burners.

Figure 1:
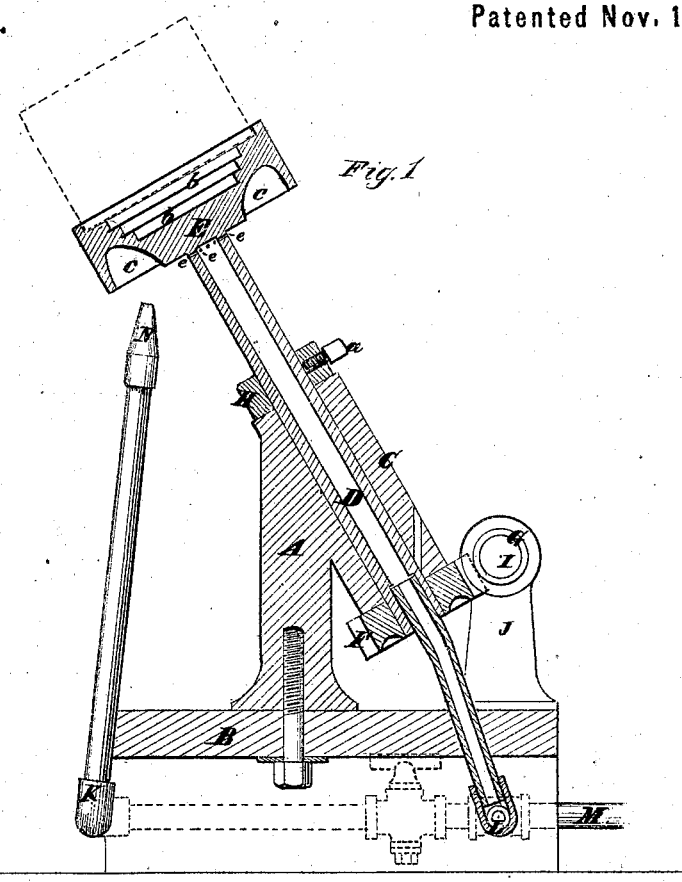
Figure 2:
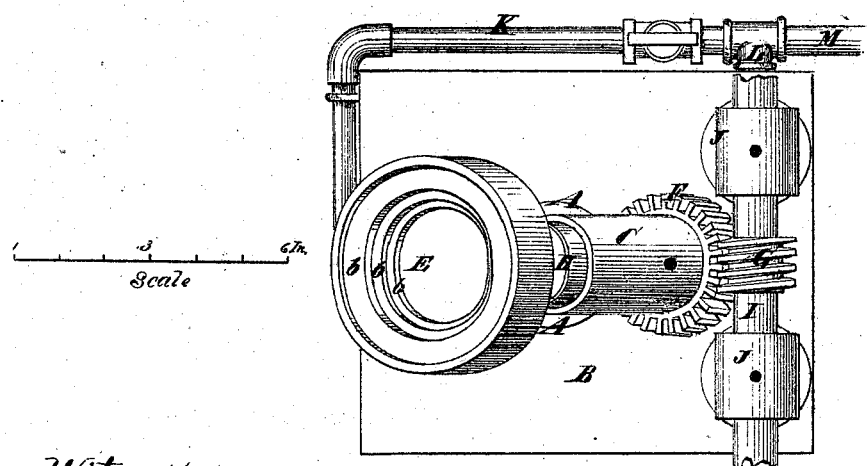

In the accompanying drawing, Figure 1 is a central vertical section of my soldering apparatus, and Fig. 2 is a plan of the same.

Similar letters of reference indicate corresponding parts in both figures.

A is a post or column, which is bolted or otherwise secured to a bed-plate or other suitable support, and has formed on its upper end an inclined bearing, C, for the reception of a shaft, D, to the upper end of which is secured the revolving soldering-bed E, which consists of a stout disk or plate of metal, in the upper surface of which are a series of circular recesses, $b\ b$, arranged one within another concentric with the axis of the shaft, the bottoms of the recesses forming a series of annular seats for the reception of cans of different sizes. In the bottom of the said bed there is a deep annular groove to facilitate the heating of the bed by a flame of gas, or heat otherwise applied underneath it. The shaft D is hollow and open at the bottom, but closed at the top, except that it has minute openings $e\ e$ in its sides, immediately under the soldering-bed, for the issue in jets of gas or air admitted at the bottom. The shaft is supported on the top of the bearing C by a collar, H, secured to it by a set-screw, and it is furnished at the bottom with a worm-gear, F, gearing with an endless screw, G, on a horizontal driving-shaft, I, which works in bearings J J on the plate B. M is a gas-pipe, intended to be connected with the main, and having two branches, K and L, the latter of which enters the lower end of the hollow shaft D, and the former leads upward and is furnished with a burner, N, directly under the groove $c$ in the inclined revolving soldering-bed.

The operation is as follows: The body and top or bottom of the can to be united are put together, and a piece of solder, with rosin or acid for a flux, are put in, and they are then placed in one of the seats $b\ b$ in the bed E, as shown in dotted outline in Fig. 1, and as soon as the solder is melted by the heat imparted to the joint by the heat of the bed, the combined inclination and revolution of the bed cause it to flow round and fill the seam. The gas by which the bed E is heated may be introduced from the pipe M through both branches K and L. That introduced through the branch L passes up the shaft D and issues in jets through the holes $e\ e$ and burns directly under the bed E, and that introduced through the pipe K, being ignited at the burner N, and burns in contact with the groove $c$ in the bed. Either branch, K or L, may be used separately for gas, and in case K only is used for gas, cold air may be introduced through L to cool the shaft; but when gas is admitted through the pipe K it will cool the shaft. The bed might be heated by a stove, constructed so as to carry the products of combustion to it. In practice I shall arrange a hood-like box over the bed to catch the smoke and fumes arising from combustion and convey them away, and it will also serve to warm the cans previously to being placed on the bed. Two or more of these soldering-machines or apparatus may be arranged side by side on one bed, and be driven by a corresponding number of endless screws G on the shaft I.

What I claim as my invention, and desire to secure by Letters-Patent, is—

1. The revolving soldering-bed, arranged in an inclined position, substantially as and for the purpose herein set forth.

2. The construction of such inclined revolving-bed, with two or more seats arranged one within another for the reception of cans of different sizes, substantially as herein described.

3. The hollow shaft D, having perforations $e\ e$ near its upper end, in combination with the inclined revolving-bed E, substantially as and for the purpose herein specified.

FRED. L. MILLER.

Witnesses:
FRED. HAYNES,
R. E. RABEAU.

(136)